(12) United States Patent
Samie et al.

(10) Patent No.: US 8,221,282 B2
(45) Date of Patent: Jul. 17, 2012

(54) SYNCHRONIZER IN ELECTRO-MECHANICAL TRANSMISSION

(75) Inventors: Farzad Samie, Franklin, MI (US); Alexander Millerman, Bloomfield Hills, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/632,886

(22) Filed: Dec. 8, 2009

(65) Prior Publication Data

US 2011/0136607 A1 Jun. 9, 2011

(51) Int. Cl.
  *F16H 3/44* (2006.01)
  *F16D 11/00* (2006.01)
(52) U.S. Cl. ..................... 475/303; 192/53.34
(58) Field of Classification Search ............... 475/5, 303
See application file for complete search history.

(56) References Cited

U.S. PATENT DOCUMENTS

| | | | | |
|---|---|---|---|---|
| 4,131,185 A | * | 12/1978 | Schall | 192/53.5 |
| 5,377,800 A | * | 1/1995 | Sperduti et al. | 192/85.63 |
| 5,657,844 A | * | 8/1997 | Wagner | 192/53.32 |
| 586,290 A | | 7/1999 | Sailler, Jr. et al. | |
| 591,393 A | | 7/1999 | Kruse et al. | |
| 593,175 A | | 8/1999 | Schmidt | |
| 6,085,880 A | * | 7/2000 | Kuhn et al. | 192/3.52 |
| 6,250,446 B1 | * | 6/2001 | Leite | 192/53.35 |
| 6,533,091 B1 | * | 3/2003 | Kawada et al. | 192/53.32 |
| 6,588,563 B1 | * | 7/2003 | Sarrach et al. | 192/53.34 |
| 6,669,596 B1 | * | 12/2003 | Sefcik | 475/278 |
| 6,719,111 B2 | * | 4/2004 | Bengtsson et al. | 192/53.32 |
| 7,198,143 B2 | * | 4/2007 | Legner | 192/53.34 |
| 7,291,087 B2 | * | 11/2007 | Haka et al. | 475/303 |
| 7,559,415 B2 | * | 7/2009 | Braford, Jr. | 192/53.32 |
| 7,572,201 B2 | * | 8/2009 | Supina et al. | 475/5 |
| 7,678,003 B2 | * | 3/2010 | Janson et al. | 475/5 |
| 7,686,733 B2 | * | 3/2010 | Hun | 475/303 |
| 7,694,793 B2 | * | 4/2010 | Wittkopp et al. | 192/53.34 |
| 7,695,387 B2 | * | 4/2010 | Oba | 475/5 |
| 8,020,682 B2 | * | 9/2011 | Saito et al. | 192/53.362 |
| 2008/0132374 A1 | | 6/2008 | Puiu | |

* cited by examiner

*Primary Examiner* — Dirk Wright

(57) ABSTRACT

An electro-mechanical transmission includes a plurality of transmission components and at least one synchronizer configured to selectively engage and disengage at least two of the transmission components to effect operation in a speed range in the transmission. The synchronizer further includes a plurality of input components associated with one of the transmission components and a plurality of output components including a clutching mechanism configured to engage to at least one of the input components when the synchronizer is activated and disengage from the input component when the synchronizer is deactivated.

21 Claims, 6 Drawing Sheets

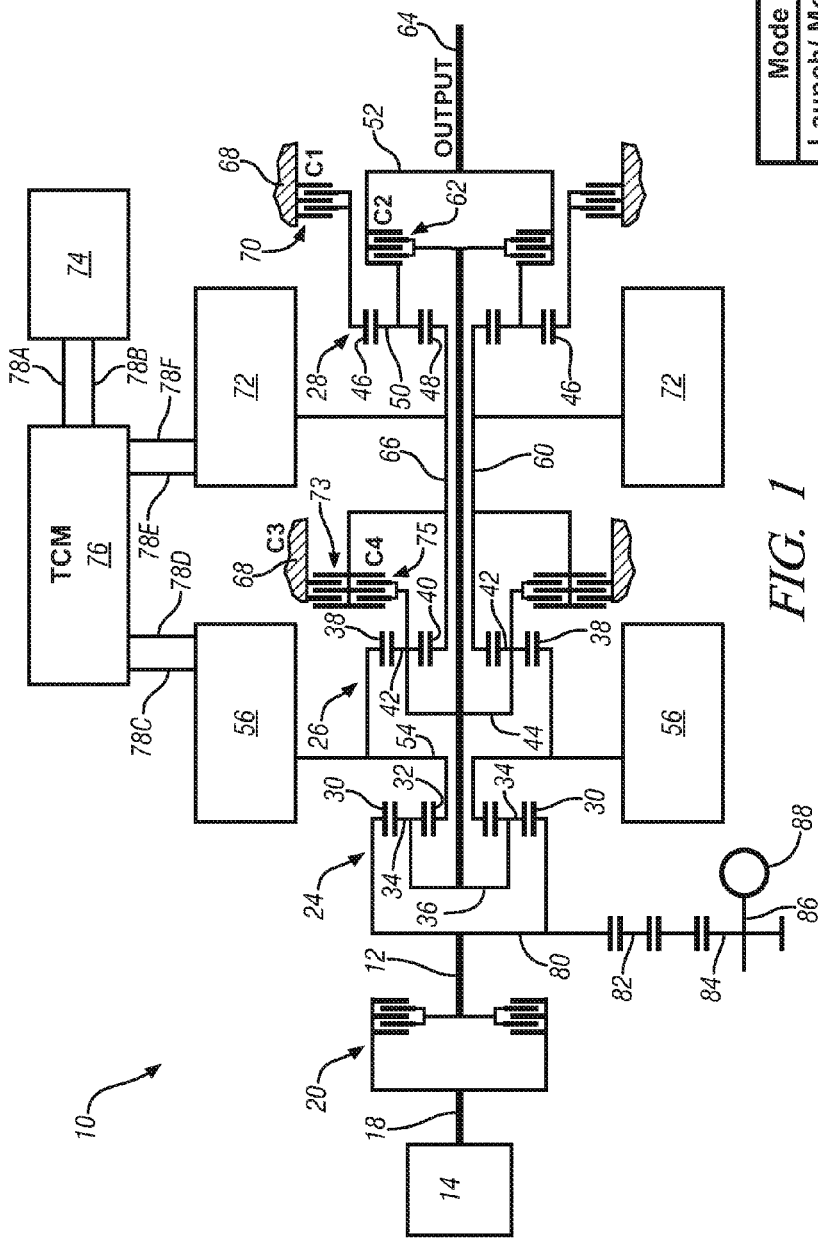

SYNCHRONIZER IN ELECTRO-MECHANICAL TRANSMISSION

TECHNICAL FIELD

This disclosure is related to torque transmitting devices used in hybrid vehicle transmissions.

BACKGROUND

Hybrid drive powertrains utilize electric motors to substitute, augment, and recover energy from other sources of driving energy, such as from an internal combustion engine. An electric motor may be utilized by attaching the motor to a drivetrain through a transmission device, such as a transmission gear set. Use of an electric motor in this manner enables the control systems of a vehicle to utilize various control schemes aimed at improving fuel efficiency of the vehicle. However, those having ordinary skill in the art will appreciate that any mechanical system attached to a drivetrain by a set of gears increases overall losses to friction and requires more energy to accelerate due to an increase in rotational inertia. An electric motor and gears associated with attachment to a drivetrain spin with a spinning drivetrain regardless of whether the electric motor is in use or not. These inefficiencies, or parasitic losses, caused by spinning the unused electric motor reduce the overall fuel effectiveness of employing a hybrid drive powertrain.

A control system monitors various inputs from the vehicle and the operator and provides operational control of the powertrain, including controlling transmission operating state and gear shifting, controlling torque-generative devices, and regulating the power interchange among the energy storage device and the torque machines to manage outputs of the transmission, including torque and rotational speed. Known multi-mode hybrid transmission can use differential gearing, torque transfer clutches, and the torque machines to transfer power to an output member that can be connected to a driveline when the powertrain is applied to a vehicle. Torque transfer clutches generally include wet clutches to change speed ratios in the transmission, and hydraulic systems are in turn used to control the wet clutches. Hydraulic systems are complex, costly, and require many components including the particularly bulky and difficult to manufacture valve bodies.

SUMMARY

An electro-mechanical transmission includes an input member, an output member and a plurality of planetary gears and torque transfer devices, and a synchronizer selectively engaging and disengaging input and output components of the transmission. The synchronizer includes a piston sequentially applying a synchronizing force and a clutching force when the synchronizer is activated, a blocker member, an input cone associated with the input components and extending radially inside the blocker member, an output cone associated with the output components and extending radially inside the blocker member and having a radius different than the input cone, a sleeve member coupled to the piston member and compressing the blocker member thereby generating a friction force between the input and output cones to synchronize the input and output components in response to the synchronizing force and sequentially engaging the output components to the input components in response to the clutching force, and a biasing member providing a biasing force against the piston and sleeve member in a direction opposite to the synchronizing and clutching forces, thereby disengaging the output components from the input components when the synchronizer is deactivated.

BRIEF DESCRIPTION OF THE DRAWINGS

One or more embodiments will now be described, by way of example, with reference to the accompanying drawings, in which:

FIG. 1 is a schematic representation of an exemplary two-mode, compound-split, electro-mechanical transmission in accordance with the present disclosure;

FIG. 2 is a fixed ratio table for the transmission shown in FIG. 1 in accordance with the present disclosure;

DETAILED DESCRIPTION

Figure 3A:
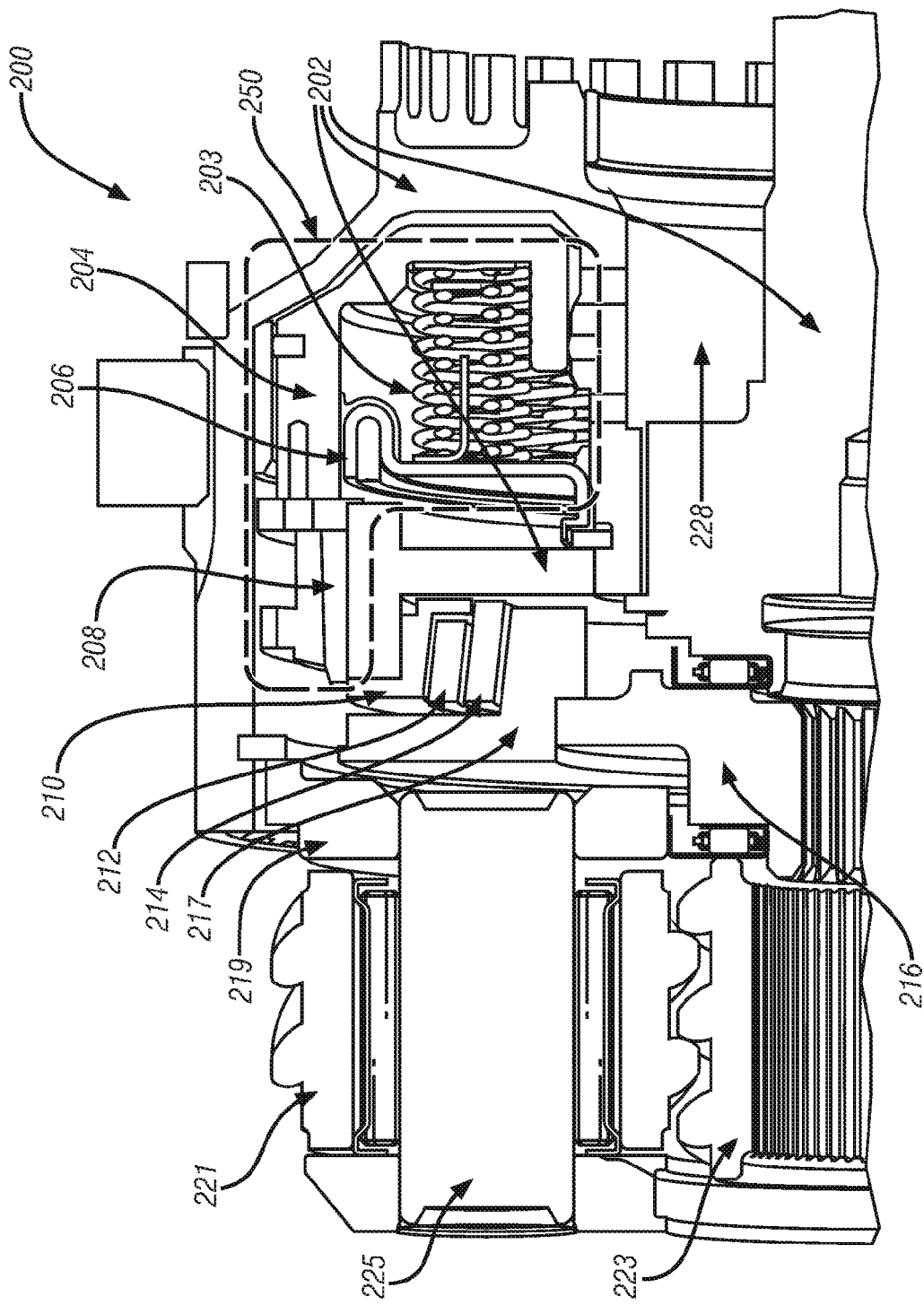
FIGS. 3A and 3B are schematic representations of a synchronizer for selectively engaging and disengaging at least two transmission components to change a speed range in the transmission shown in FIG. 1 in accordance with the present disclosure.

Referring now to the drawings, wherein the showings are for the purpose of illustrating certain exemplary embodiments only and not for the purpose of limiting the same, FIG. 1 schematically illustrates hybrid transmission 10 having an internal combustion engine 14, a first motor/generator 56, a second motor/generator 72 and three planetary gear subsets 24, 26 and 28.

As used herein, the term control module means any suitable one or various combinations of Application Specific Integrated Circuit(s) (ASIC), electronic circuit(s), a central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The motor/generators 56 and 72 are electrically interconnected with a transmission control module (TCM) 76, which in turn communicates with an energy storage source 74 generally including a plurality of batteries. The TCM 76 distributes power to and from the motor/generators 56 and 72 and the batteries 74 and also communicates control signals with the motor/generators which are issued to control the speed and torque of the motor/generators 56 and 72.

The hybrid transmission 10 utilizes three planetary gear subsets 24, 26 and 28 The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 has an outer gear member 38 that may generally be designated as the ring gear, which circumscribes an inner gear member 40, generally designated as the sun gear. A plurality of planet gear members 42 are rotatably mounted on a carrier 44 such that each planet gear member 42 meshingly engages both the outer gear member 38 and the inner gear member 40.

The third planetary gear subset 28 has an outer gear member 46 that may generally be designated as the ring gear, which circumscribes an inner gear member 48, generally designated as the sun gear. A plurality of planet gear members 50 are rotatably mounted on a carrier 52 such that each planet gear member 50 meshingly engages both the outer gear member 46 and the inner gear member 48.

While all three planetary gear sets 24, 26 and 28 are simple planetary gear sets in their own right, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to the first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 configured as a synchronizer 200 (shown in FIGS. 3A, 3B and 6) which, as will be hereinafter more fully explained, is employed to assist in the selection of the operational modes of the hybrid transmission 10. Operational modes include a first mode (Mode 1), a second mode (Mode 2) and fixed gears.

The carrier 52 of the third planetary gear set 28 is connected directly to the transmission output member 64. When the hybrid transmission 10 is used in a land vehicle, the output member 64 may be connected to the vehicular axles that may, in turn, terminate in the drive members. The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70 configured as the synchronizer 200 (shown in FIGS. 3A, 3B and 6), as is also hereinafter explained, is employed to assist in the selection of the operational modes (i.e., Mode 1, Mode 2 or fixed gears) of the hybrid transmission 10. The sleeve shaft 66 is also continuously connected to the second motor/generator 72. All the planetary gear sets 24, 26 and 28 as well as the two motor/generators 56 and 72 are coaxially oriented, as about the axially disposed shaft 60. It is also noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e., the circumferential dimension—of the transmission 10 is minimized.

Figure 3B:
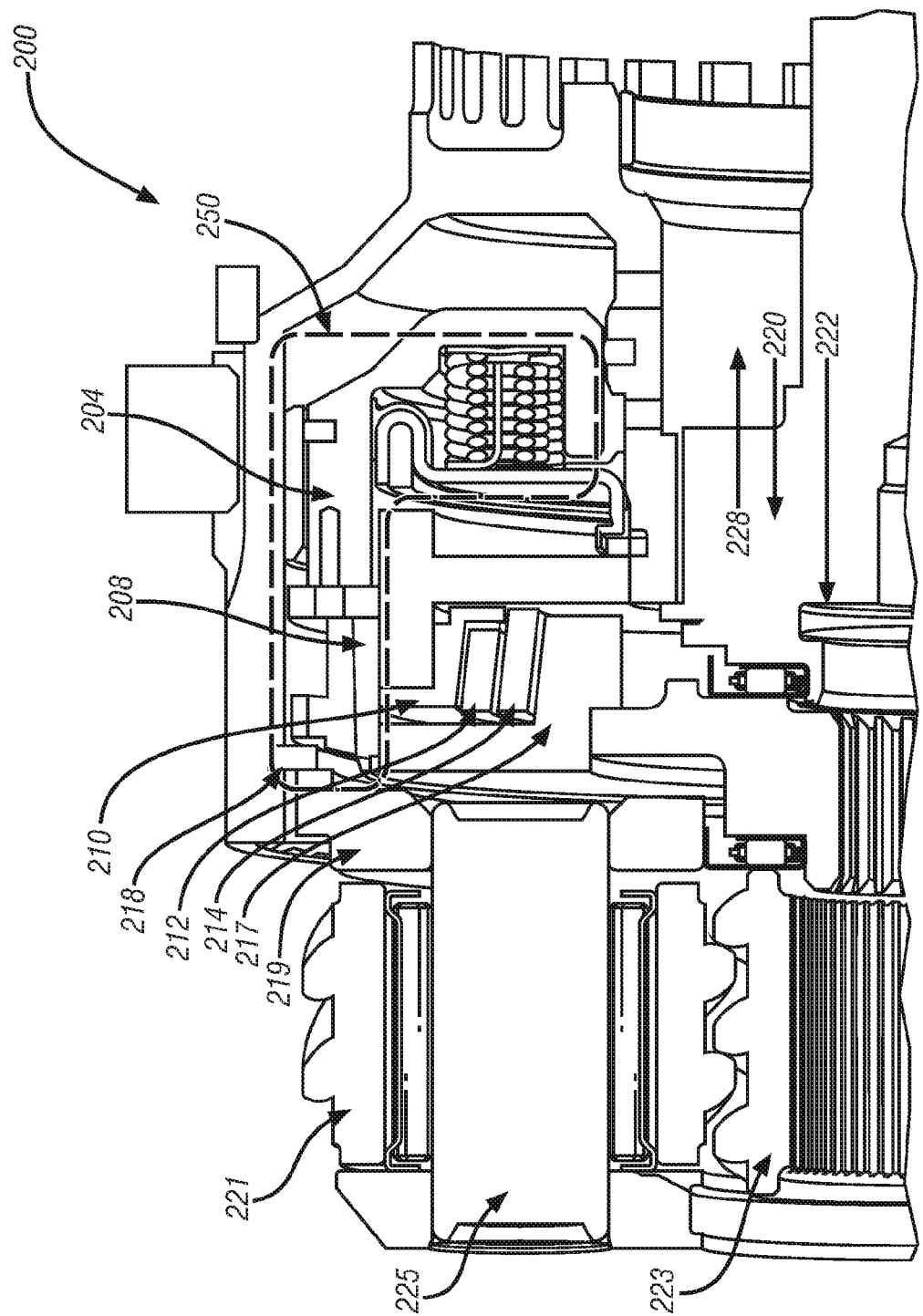
Figure 6:
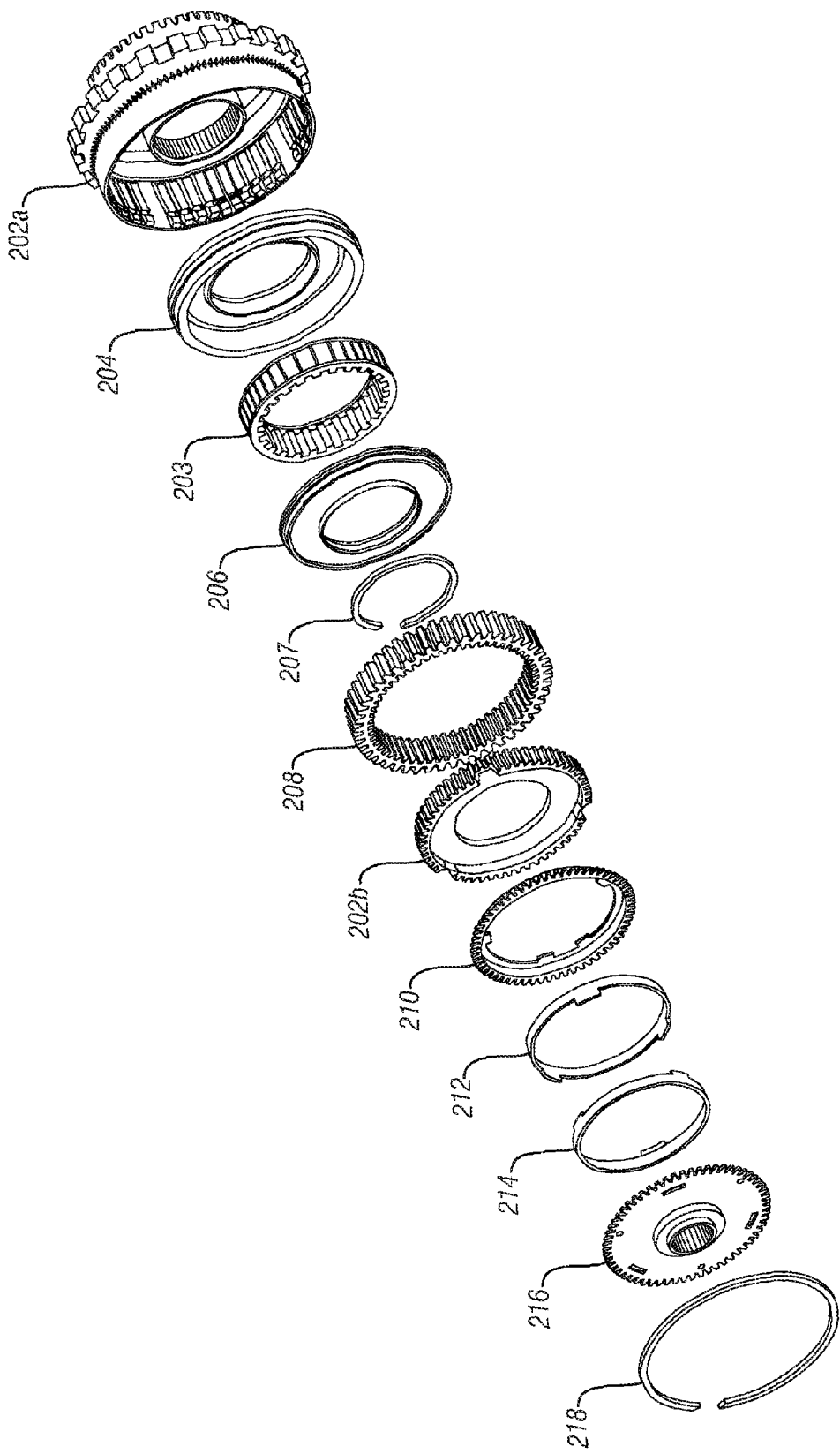
FIG. 6 illustrates a disassembled view of the synchronizer of FIGS. 3A and 3B in accordance with the present disclosure.

A torque transfer device 73 configured as the synchronizer 200 (shown in FIGS. 3A, 3B and 6) selectively connects the sun gear 40 with ground (i.e., with transmission housing 68). A torque transfer device 75 configured as the synchronizer 200 (shown in FIGS. 3A, 3B and 6) thereby engaging planetary gear sets 24, 26, motors 56, 72 and the input 12 to rotate as a group, by selectively connecting the sun gear 40 with the carrier 44. In the exemplary embodiment, torque transfer devices 62, 70, 73 and 75 are all configured as synchronizers 200, each including a clutching mechanism 250 to provide engagement between input and output transmission components, as illustrated in FIGS. 3A, 3B and 6.

The electric storage device 74 communicates with a transmission control module (ECU) 76 by transfer conductors 78A and 78B. The TCM 76 communicates with the first motor/generator 56 by transfer conductors 78C and 78D, and the TCM 76 similarly communicates with the second motor/generator 72 by transfer conductors 78E and 78F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified as to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings. This same suffix convention shall be employed throughout the specification.

A drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

In order to provide a full explanation as to the operation of a transmission embodying the concepts of the present invention, a description of the operational modes (i.e., Mode 1, Mode 2 or fixed gear ratios) employed to achieve the output power and speeds necessary to meet the operator demand under various operating conditions will be provided with respect to the preferred embodiment. As such, the following description describes the full power operational states of the particular transmission identified by the numeral 10.

To reiterate, the exemplary transmission 10 is a two-mode, compound-split, electro-mechanical, vehicular transmission. In other words, the output member 64 receives power through two distinct gear trains within the transmission 10. A first of the gear trains includes Mode 1, which is selected when the torque transfer device 70 (i.e., synchronizer 200 shown in FIGS. 3A, 3B and 6) is activated in order to "ground" the outer gear member 46 of the third planetary gear set 28. A second of the gear trains includes Mode 2, which is selected when the torque transfer device 70 (i.e., synchronizer 200 shown in FIGS. 3A, 3B and 6) is released and the torque transfer device 62 (i.e., synchronizer 200 shown in FIGS. 3A, 3B and 6) is simultaneously activated to connect the shaft 60 to the carrier 52 of the third planetary gear set 28.

Those skilled in the art will appreciate that the TCM 76 serves to provide a range of output speeds from relatively slow to relatively fast within each operational mode. This combination of two gear trains (i.e., Mode 1 and Mode 2) with a slow to fast output speed range in each operational mode allows the transmission 10 to propel a vehicle from a stationary condition to highway speeds while satisfying the other objects of the invention. Additionally, the TCM 76 coordinates operation of the transmission 10 so as to allow synchronized shifts between Mode 1 and Mode 2. As noted, operation of the preferred embodiment will be described as it relates to full power operation inasmuch as that approach will fully describe the general operational concepts.

In the following description, it is also noted that the first and second modes of operation (i.e., Mode 1 and Mode 2) refer to circumstances in which the transmission functions are controlled by a single one of the torque transfer devices 62 or 70 both which can be configured as the synchronizer 200 (shown in FIGS. 3A, 3B and 6), and by the controlled speed and torque of the motor/generators 56 and 72. Also, certain ranges of operation are described below in which fixed ratio operation can be achieved by applying an additional one of the torque transfer devices 62, 73 or 75.

When selectively controlling main fuel injection into each combustion chamber additional one of the torque transfer devices 62, 73 or 75 is applied, a fixed ratio of input to output speed is achieved. The rotations of the motor/generators 56, 72 will then be dependent on internal rotation of the mechanism as defined by the engaging of one of the additional torque transfer devices 62, 73 or 75 and proportional to the input speed. The motor/generators 56 and 72 still can function as motors or generators; however, they are completely independent of engine 14 to output power flow, thereby enabling both to be motors, both to function as generators, or any combination thereof. This allows, for instance, during acceleration in the first fixed ratio that the engine 14 power and both units functioning as motors accepting power from the energy storage device 74 to be additive into propelling the vehicle through planetary gear set 28 to output 64.

It is also noted that the function of the transmission 10 can at any time be switched from operation in one of the fixed gears to Modes 1 or 2 by turning the torque transfer device 62, 73 or 75 off during a mode of operation. Determination of operation in fixed gear, Mode 1 or Mode 2 is by algorithms in the TCM 76 controlling the transmission 10.

FIG. 2 describes operation of the transmission 10 in table form, including activation of specific ones of torque transfer devices C1 70, C2 62, C3 73, and C4 75. This includes the Mode 1, Mode 2, and $1^{st}$, $2^{nd}$, $3^{rd}$, and $4^{th}$ fixed ratios. It is also noted that Mode 1 and Mode 2 may overlap the ratio of operation, and selection depends again on the operator's input and response of the vehicle to that input. The first fixed ratio range falls within Mode 1 operation when C1 and C4 (torque transfer devices 70 and 75) are engaged, and the second fixed ratio range falls within Mode 1 when C2 and C1 (torque transfer devices 62 and 70) are engaged. The third fixed ratio range is available during Mode 2 when C2 and C4 (torque transfer devices 62 and 75) are engaged, and the fourth fixed ratio range is available during Mode 2 when C2 and C3 (torque transfer devices 62 and 73) are engaged. As discussed above, any one of C1, C2, C3 and C4 can include the synchronizer 200 illustrated in FIGS. 3A, 3B and 6.

In Mode 1 when the TCM 76 has determined that the operator desires to move forwardly from a stationary condition, and to accelerate, the torque transfer device 20 is engaged operatively to connect the engine 14 to the hybrid transmission 10, and torque transfer device 20 remains applied as the vehicle moves forwardly through a speed range hereinafter more fully described. The torque transfer device 62 configured as the synchronizer 200 is not applied, and it remains disengaged. The torque transfer device 70 configured as the synchronizer 200 is engaged. In this situation, the engine 14 applies driving power to the outer gear member 30 of the first planetary gear set 24 so the outer member 30 rotates in unison with the input member 12 (and thus the engine 14). The first motor/generator 56 simultaneously rotates the inner gear member 32 of the first planetary gear set 24 and the outer gear member 38 of the second planetary gear set 26 in the same direction, thus driving the carrier 36 in the same direction—which effects rotation of the inner gear member 40 of the second planetary gear set 24.

The second motor/generator 72 operates as a motor during Mode 1, and as such motor/generator 72 drives sleeve shaft 66 in that direction which rotates the inner gear member 48 of the third planetary gear set 28 to rotate the planet gears 50 of the third planetary gear set 28 against the outer gear member 46 of the third planetary gear set 28. The outer gear member 46 is fixed by having been grounded so that the carrier 52 drives the output member 64 in that direction required to effect forward movement of the vehicle.

That rotation of the sleeve shaft 66 effected by rotation of the second motor/generator 72 operating as a motor also rotates the inner gear member 40 of the second planetary gear set 26. Because the torque transfer device 62 configured as the synchronizer 200 remains disengaged, the carriers 36 and 44 of the first and second planetary gear sets 24 and 26, respectively, are freely rotatable—but only in unison inasmuch as the two carriers 36 and 44 are compounded. As a result, the rotation of the outer gear member 30 of the first planetary gear set 24 effected by the engine 14 and the rotation of the inner gear member 40 effected by the second motor/generator 72 force the inner gear member 32 of the first planetary gear set 24 and the conjoined outer gear member 38 of the second planetary gear set 26 to drive the first motor/generator 56 in that direction, and velocity, which causes the first motor/generator 56, at least initially, to serve as a generator.

In normal operation, only the torque transfer device 70 configured as the synchronizer 200 would be engaged at low speeds, but if maximum power is demanded, then the torque transfer device 75 configured as the synchronizer 200 is also engaged. The motors 56, 72 may be turned on with the torque transfer device 75 configured as the synchronizer 200 to achieve maximum available horsepower, and the motors/generators' 56, 72 power may be reduced to reduce operating temperatures. This torque transfer device 75 configured as the synchronizer 200 also provides the ability for the engine 14 and both motor/generators 56 and 72, to simultaneously propel the vehicle for maximum acceleration.

Shifting to the second fixed gear ratio within Mode 1, the torque transfer device 75 configured as the synchronizer 200 is disengaged while torque transfer devices 62 and 70, both configured as the synchronizer 200, are engaged. All three gear sets 24, 26, 28 are active, and the ratio is 1.7:1, where the motors/generators 56, 72 may be turned off during the engagement of torque transfer devices 62 and 70, both configured as the synchronizer 200 for fully mechanical operation. During the second fixed gear ratio, the motors 56, 72 may freewheel and no torque is present. Mode 1 ends when the torque transfer device 70 configured as the synchronizer 200 is disengaged and the torque transfer device 62 configured as the synchronizer 200 remains engaged for the high-efficiency Mode 2.

The third and fourth fixed ratios are available during the second mode. The third fixed ratio may be established with the simultaneous engagement of torque transfer devices 62 and 75, both operative as the synchronizer 200, which locks all gear sets into a 1:1 ratio so that the output 64 rotates at the same speed as the input 12. The fourth fixed ratio is established with the engagement of torque transfer devices 62 and 73, both operative as the synchronizer 200, wherein the first and second planetary gear sets 24 and 26 are active, and the motor/generators 56 and 72 may freewheel with no torque present. Accordingly, the transmission 10 of the invention provides three mechanical points and four available fixed ratios, thereby minimizing electrical losses in the motors/generators 56 and 72 while providing maximum power quickly in the first mode via the engagement of the torque transfer device 75 configured as the synchronizer 200.

Alternatively, the torque transfer device 75 operative as the synchronizer 200 could be positioned elsewhere on the planetary gear sets 24 and 26. For example, the torque transfer device 75 configured as the synchronizer 200 may connect the sun gear 40 and ring gear 48 of the second planetary gear set 26. As a further alternative, the lock-up clutch may connect the carrier 36 and ring gear 30 of the first planetary gear set 24.

Figure 4:
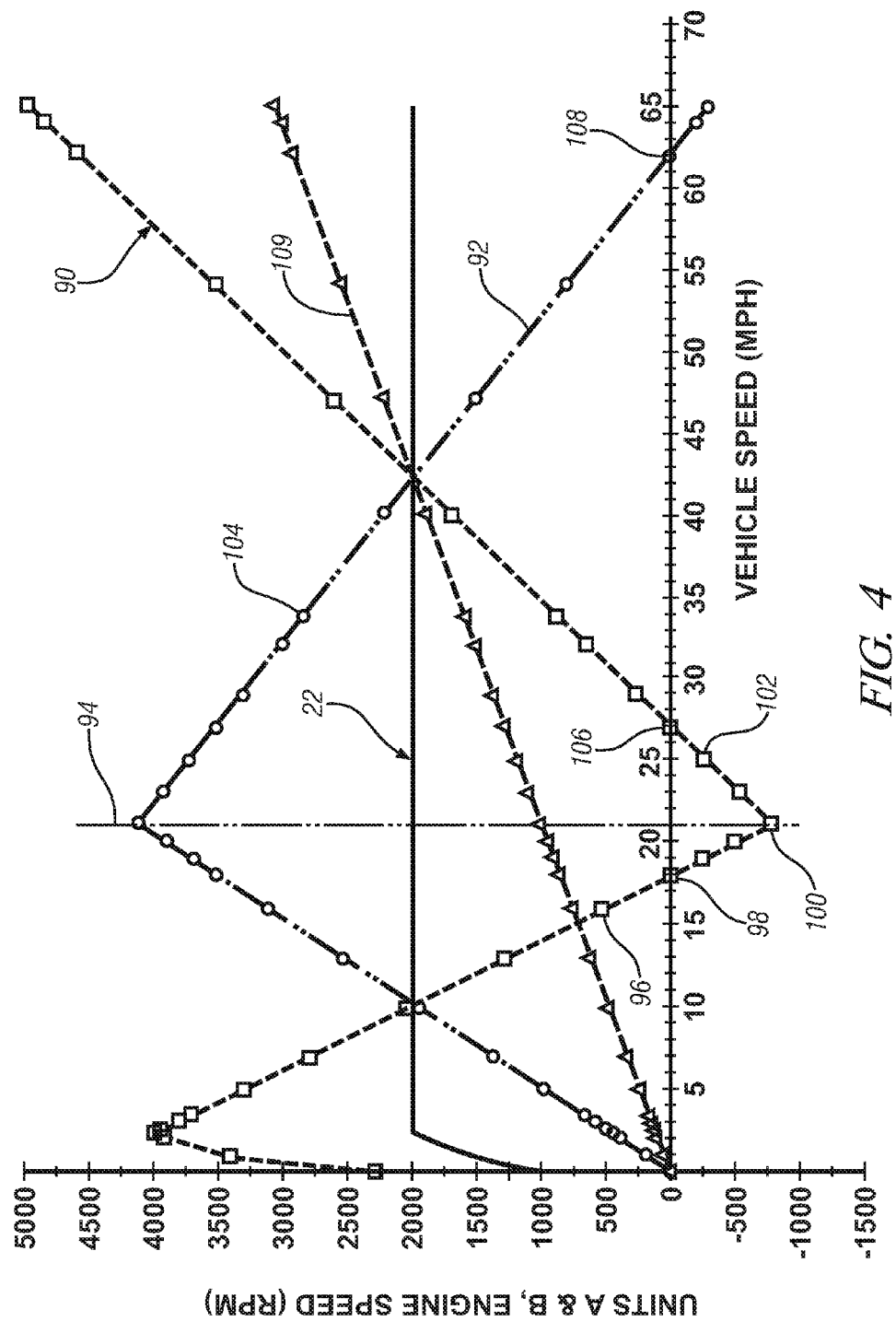
FIG. 4 is a graphical representation of the rotations per minute (RPM) of each motor/generator as well as the engine relative to the speed of the vehicle in miles per hour (MPH) of the exemplary transmission of FIG. 1 in accordance with the present disclosure.

FIG. 4 is a graphical representation of the rotations per minute (RPM) of each motor/generator 56 and 72 as well as the engine 14 relative to the speed of the vehicle in miles per hour (MPH) obtained by virtue of the transmission 10 depicted in FIG. 1 is illustrated. Curve 22 is the plot of the engine 10 speed in revolutions per minute (RPM) against the speed in miles per hour (MPH) of the vehicle in which the engine 14 and hybrid transmission 10 are incorporated. For convenience, it is noted that curve 22 is uninterrupted by visual plot points. Curve 90 is the plot of the rotational speed (RPM) of the first motor/generator 56, also relative to the speed (MPH) of the vehicle. This curve may be readily distinguished by the fact that the plot points appear as small squares. Curve 92 is the plot of the rotational speed (RPM) of the second motor/generator 72 relative to the speed (MPH) of the vehicle. This curve may be readily distinguished by the fact that the plot points appear as small circles.

Mode 1 of transmission 10 extends from the abscissa, which designates engine speed (RPM), to line 94 which is drawn parallel to the abscissa and which defines the shift from Mode 1 to Mode 2 of the transmission 10. In the representative embodiment described, Mode 1 extends from the vehicle at rest to a forward speed on the order of about 21 MPH. At speeds greater than about 21 MPH the transmission operates in Mode 2.

As previously noted, the second motor/generator 72 operates as a motor through Mode 1 from zero to about 21 MPH. The first motor/generator 56, however, operates as a generator until approximately 16 MPH—represented by plot point 96 on curve 90—and thereafter operates as a motor within Mode 1. The aforesaid transition in the operation of the first motor/generator 56 is the result of the number of teeth on the various gears within the planetary gear subsets which cause the speeds of the two motor/generators 56 and 72 to reverse at various operational speeds of the vehicle.

The transition from the first to the second mode of operation is achieved by disengaging the torque transfer device 70 configured as the synchronizer 200 and simultaneously applying the torque transfer device 62 configured as the synchronizer 200. At the inception of Mode 2, the first motor/generator 56 transitions from operating as a motor to operating as a generator. Inasmuch as the transition from operation of the transmission 10 in Mode 1 to Mode 2 occurs at line 94, the transition of the first motor/generator 56 from a motor to a generator occurs at point 100 on curve 90—which also delineates the intersection of the curve 92 with line 94. The first motor/generator 56 continues to operate as a generator during operation of the transmission 10 in Mode 2 while the vehicle gains speed from about 21 MPH to about 25 MPH. At about 25 MPH the first motor/generator 56 transitions from operation as a generator back to operation as a motor. This transition is represented as point 102 on curve 90. The first motor/generator 56 continues thereafter to operate as a motor.

At the beginning of Mode 2, the second motor/generator 72 continues to operate as a motor. In fact, the second motor/generator 72 operates as a motor until the vehicle reaches a speed of about 33.6 MPH, as represented at plot point 102 on curve 92, at which point it transitions to operation as a generator, and continues thereafter to operate as a generator.

With the configuration of the transmission 10 heretofore described, and with the aforesaid number of teeth on the inner and outer gear members, the transmission 10 provides two mechanical points while operating in the second mode. That is, the first motor/generator 56 has a zero rotational speed at about 27 MPH, as designated by point 106 on curve 90. In addition, the second motor/generator 72 has a zero rotational speed at about 62 MPH, as designated by point 108 on curve 92. Hence, the transmission 10 provides two mechanical points in Mode 2.

It should be understood that the exact location of the aforesaid mechanical points is determined not only by the number of teeth on the inner and outer gear members of the planetary gear subsets, but also by the rotational speed of the input shaft 12. Hence, with the number of teeth disclosed for the inner and outer gear members in the first of the exemplary embodiments, an increase in the speed of the input shaft 12 will shift the locations of the mechanical points to higher vehicular speeds, and conversely, a reduction in the speed of the input member 12 will shift the mechanical points to lower vehicular speeds.

In the exemplary embodiment of the present disclosure, as mentioned above, both torque transfer devices 62 and 70 are both configured as the synchronizer 200. However, embodiments envisioned can include torque transfer device 70 configured as the synchronizer 200 while the torque transfer device 62 is configured as a selective one-way clutch device (SOWC), torque transfer device 62 configured as the synchronizer 200 while torque transfer device 70 is configured as the SOWC. Likewise, it can further be appreciated that alternative embodiments include torque transfer device 62 configured as the synchronizer 200 while torque transfer device 70 is a known wet clutch, or alternatively, torque transfer device 70 configured as the synchronizer 200 (shown in FIGS. 3A, 3B and 6) while the torque transfer device 62 is configured as the known wet clutch. Additionally, torque transfer devices 73 and 75 can be configured as the synchronizer 200, SOWCs, known wet clutches or any combination thereof.

SOWCs can be utilized in some transmissions to reduce parasitic losses. Known SOWCs can transfer torque between contiguous coaxial rotating devices when applied. Each of the contiguous rotating devices has a race. One race is oriented radially concentric to and opposing the race of the other rotating device, or the two races are opposite each other axially. A multiplicity of controllable torque transferring devices, e.g., rollers, sprags, rockers or struts, are connected to one of the races and positioned to oppose the other race. The opposed race includes a multiplicity of surface receiving features corresponding to the controllable torque transferring devices. Known selectable one-way clutch devices are applied by controlling the controllable torque transferring devices to interact with and connect to the surface receiving features to lock rotations of the contiguous rotating devices to transfer torque therebetween. When one of the contiguous rotating devices rotates in the first direction, torque is transferred to the other contiguous rotating device. When the contiguous rotating device rotates in a second direction opposite to the first direction, no torque is transferred, permitting the rotating device to freewheel.

Synchronizers can be utilized to substantially reduce parasitic losses, and thereby improve fuel economy. Synchronizers associated with a clutching mechanism can be utilized to engage two rotating transmission components so that they rotate at the same speed while avoiding a transmission bump, or noticeable impulse load during an operating mode change (i.e., to one of Mode 1, Mode 2 or fixed gears). Synchronizers can be selectively activated to engage or ground, and deactivated to disengage or unground a particular transmission component when the transmission changes operating modes (i.e., to one of Mode 1, Mode 2 or fixed gears).

In an exemplary embodiment of the present disclosure, FIGS. 3A and 3B illustrate the exemplary synchronizer 200. As discussed above, the synchronizer 200 can be used to smoothly engage two rotating transmission 10 components so they rotate at the same speed while avoiding a transmission bump, or noticeable impulse load during an operating mode change. Similarly, the synchronizer 200 can ground one rotating transmission component to a stationary component within the transmission 10 (i.e., transmission housing). Referring to FIG. 3A, the synchronizer 200 can be selectively deactivated in a disengaged state, wherein the respective transmission component rotates independently when the transmission 10 changes operating modes (i.e., Mode 1, Mode 2 or fixed gears), and thus is permitted to free-wheel. Referring to FIG. 3B, the synchronizer 200 can be selectively activated, wherein the respective transmission component is engaged to another transmission component, and thereby transfers power therebetween. It should be appreciated that the exemplary synchronizer 200 corresponds to a torque transfer device engaging two rotating transmission components, similar to the torque transfer device 62. However, the exemplary synchronizer 200 can be similarly configured to correspond to a torque transfer device for grounding a rotating transmission component to a stationary transmission component, similar to the torque transfer device 70 to the transmission housing 68. As will become apparent, the exemplary synchronizer 200 is associated with a clutching mechanism 250 configured to provide engagement between input and output transmission components.

Still referring to FIGS. 3A and 3B, the exemplary synchronizer 200 ensures smooth engagement by substantially matching the rotating speeds between respective transmission components, i.e., input and output transmission components, when the transmission changes operating modes (i.e., Mode 1, Mode 2 or fixed gears). The synchronizer 200 includes the output components preferably including a rotating housing assembly 202, an output member 219, a biasing member 203, a piston member 204, a piston balance member 206, a sleeve member 208, a blocker member 210 and an output cone 214; and the input components preferably including an input cone 212, an input member 216 and input teeth 217. Furthermore, and discussed in greater detail herein, the clutching mechanism 250 includes the piston member 204, the piston balance member 206, the biasing member 203 and the sleeve member 208 associated with said output components, wherein the clutching mechanism 250 in the exemplary embodiment is a dog-clutch arrangement. FIGS. 3A and 3B further illustrate components of a planetary gear set including a planet gear member 221 and an inner gear member 223, generally designated as the sun gear. The output member 219 is generally designated as a carrier, wherein a pinion 225 rotatably mounts the planet gear member 221 to the output member 219 designated as the carrier.

Referring again to FIG. 3A, when the synchronizer 200 is in the disengaged state, power is not transferred between the input and the output components of the synchronizer 200. When the synchronizer is disengaged, the output components including the rotating housing assembly 202, the output member 219, the biasing member 203, the piston member 204, the piston balance 206, the sleeve member 208 and the output cone 214 all rotate together at the same speed. The input components including the input member 216, the input teeth 217 and the input cone 212 rotate together, but independently of the output components. In an alternative embodiment, the output components are all stationary while the input components rotate together at the same speed. In another alternative embodiment, the output components all rotate together at the same speed while the input components are stationary.

Referring to FIG. 3B, the synchronizer 200 is selectively activated and in the engaged state, wherein power is transferred between the input and output components of the synchronizer 200. In an exemplary example, synchronizer 200 corresponds to torque transfer device 62, wherein the input components are associated with the shaft 60 and the output components of the synchronizer 200 are associated with the carrier 52 of the third planetary gear set 28. Alternatively, the input components can be associated with the carrier 52 and the output components can be associated with the shaft 60. In another exemplary example, the synchronizer 200 corresponds to torque transfer device 70, wherein the input components are associated with the outer gear member 46 of the planetary gear set 28 and the output components are associated with the transmission housing 68. Alternatively, the input components can be configured to be associated with the transmission housing 68 and the output components can be associated with the output gear member 46.

Selective actuation of the synchronizer 200 can be provided by the TCM 76, wherein rotational speeds between the input and output components are first synchronized, and subsequently, the clutching mechanism 250 associated with the synchronizer 200 attains engagement between said input and output components. Specifically, the TCM 76 commands the piston member 204 to exert a synchronizing force 220 against the sleeve member 208 resulting in the sleeve member 208 to longitudinally transfer toward the input components and compress against the blocker member 210. The compression between the sleeve member 208 and the blocker member 210 generates friction between the input and output cones 212, 214, respectively, to synchronize the input and output speeds of the input and output components, respectively. When the input and output components are synchronized (i.e., the rotational speeds are equal), the clutch slip between the input and output components is effectively zero. Thus, a smooth transition to effectively engage the input and output components occurs during periods when the measured clutch slip between said input and output components is substantially zero. A person having ordinary skill in the art recognizes that clutch holding torque is zero when the clutch slip is zero. Utilization of the synchronizer 200 enables the rotational speeds of said input and output components to only be within the same vicinity of each other, wherein the synchronizer 200 provides for synchronization of rotational speeds between the input and output components to establish and maintain a clutch slip of substantially zero for optimal smooth engagement between transmission components (i.e., the input and output components).

After the TCM 76 determines that the input and output speeds of the input and output components, respectively, are effectively synchronized (i.e., clutch slip is substantially zero), the clutching mechanism 250 associated with the synchronizer 200 is activated, wherein a clutching force 222 exerted by the piston member 204 against the sleeve member 208 is provided. The clutching force 222 longitudinally transfers the sleeve member 208 toward the input member 216, thereby engaging the input teeth 217 associated with the input member 216 to the sleeve member 208. The longitudinal transfer of the sleeve member 208 is terminated when engagement between the sleeve member 208 and the input teeth 217 is attained, and the sleeve member 208 contacts an internal snap ring 218.

Likewise, the clutching mechanism 250 associated with the synchronizer 200, when selectively deactivated, is configured to disengage and release the input components from said output components. The biasing member 203 provides a biasing force 228 to return the piston member 204 and the sleeve member 208 back to the disengaged state shown in FIG. 3A. It should be appreciated that torque being transferred between said input and output components must be reduced to substantially zero in order to deactivate said synchronizer 200 and said clutching mechanism 250 associated therewith, and thereby disengage said input and output components.

In an exemplary embodiment of the present disclosure, an exploded view of the synchronizer 200 described in FIGS. 3A and 3B is illustrated in FIG. 6. The synchronizer 200 includes a first rotating housing member 202a, the biasing member 203, the piston member 204, the piston balance member 206, an external retaining ring 207, the sleeve member 208, a second rotating housing member 202b, the blocker member 210, the input cone 212, the output cone 214, the input member 216 and the internal snap ring 218. In the above mentioned embodiments, it is appreciated that torque transfer device 62 configured as the synchronizer 200 involves monitoring the rotational speeds of two rotating transmission components: the shaft 60 and the carrier 52 of the third planetary gear set 28. For an optimal smooth engagement between the shaft 60 and the carrier 52, the rotational speeds must be substantially equal, and thus, a clutch slip of substantially zero between the two transmission components is desired. When the TCM 76 determines that the rotational speeds of the shaft 60 and the carrier 52 are within the vicinity of one another, the synchronizer 200 provides for synchronization utilizing the clutching mechanism 250 to apply the synchronization force 220 to match the rotational speeds of the shaft 60 and the carrier 52. In a non-limiting example, rotational speeds of rotating transmission components are within the same vicinity as one another when the difference between rotational speeds is less than 50 RPM. When the rotational speeds of the shaft 60 and the carrier 52 are matched, a clutch slip of substantially zero can be established and maintained for optimal smooth engagement between the shaft 60 and the carrier 52, wherein the engagement is provided by clutching mechanism 250 applying the clutching force 222. In a non-limiting example the clutching mechanism 250 is a dog-clutch arrangement.

Engagement between the shaft 60 and the carrier 52 is desired during the operating mode shift from the first fixed gear in Mode 1 to the second fixed gear in Mode 1. The synchronizer 200 maintains engagement between the shaft 60 and the carrier 52 during Mode 2 and the third and fourth fixed gears. Likewise, the clutching mechanism 250 associated with the synchronizer 200 is deactivated to disengage the carrier 52 from the shaft 60 during operating mode shifts from the second fixed gear to the first fixed gear in Mode 1. It is appreciated that disengagement of the carrier 52 from the shaft 60 requires the torque transferred between the carrier 52 and the shaft 60 to reduce to substantially zero before disengagement can be provided.

In another exemplary embodiment, it is appreciated that torque transfer device 70 configured as the synchronizer 200 involves monitoring the rotational speed of one rotating transmission component: the outer gear member 46 of the third planetary gear set 28. For smooth engagement between the output gear member 46 and the stationary transmission housing 68, the rotational speed of the output gear member 46 must be substantially zero to establish a desired clutch slip of substantially zero between the output gear member 46 and the transmission housing 68. When the TCM 76 determines that the rotational speed of the output gear member 46 is within the vicinity of zero, the synchronizer 200 provides for synchronization of the rotational speed of the output gear member 46 to match the stationary transmission housing 68, wherein the synchronizer 200 utilizes the clutching mechanism 250 to apply the synchronization force 220. In a non-limiting example, the rotational speed of the output gear member 46 is within the vicinity of zero at speeds less than 50 RPM. When the rotational speed of the output gear member 46 matches the transmission housing 68 (i.e., 0 RPM), a clutch slip of substantially zero can be established and maintained for optimal smooth engagement between the output gear member 46 and the transmission housing 68, wherein the engagement is provided by applying the clutching force 222 provided by the clutching mechanism 250 associated with the synchronizer 200. In a non-limiting example the clutching mechanism 250 is a dog-clutch arrangement.

Engagement between the output gear member 46 and the transmission housing 68 is desired to ground the output gear member 46 thereto. Grounding the output gear member 46 is desired during vehicle start-up, reverse mode and when the vehicle is in neutral or park. The synchronizer 200 maintains grounding of the output gear member 46 during the first and second fixed gears in Mode 1. Likewise, the clutching mechanism 250 associated with the synchronizer 200 is deactivated to disengage the output gear member 46 from the transmission housing 68 when the operating mode shifts from the second fixed gear to Mode 2, thereby permitting the output gear member 46 to be released and free-wheel. It is appreciated that the disengagement of the output gear member 46 from the transmission housing 68 requires the torque of the output gear member 60 to be reduced to substantially zero before disengagement is provided. Furthermore, during brake regeneration when the operating mode shifts from Mode 2 to the second fixed gear in Mode 1, grounding the output gear member 46 to the transmission housing 48 is desired.

With reference to FIGS. 1, 3A-B, 5A-B and 6, algorithms 500 and 520 for providing selective engagement and disengagement between the input and output components utilizing the synchronizer 200 are illustrated. The input and output components include, but are not limited to, the outer gear member 46, the housing 68, the carrier 52 and the shaft 60 discussed above. It should be appreciated that the algorithm 500 is performed by the TCM 76.

Figure 5A:
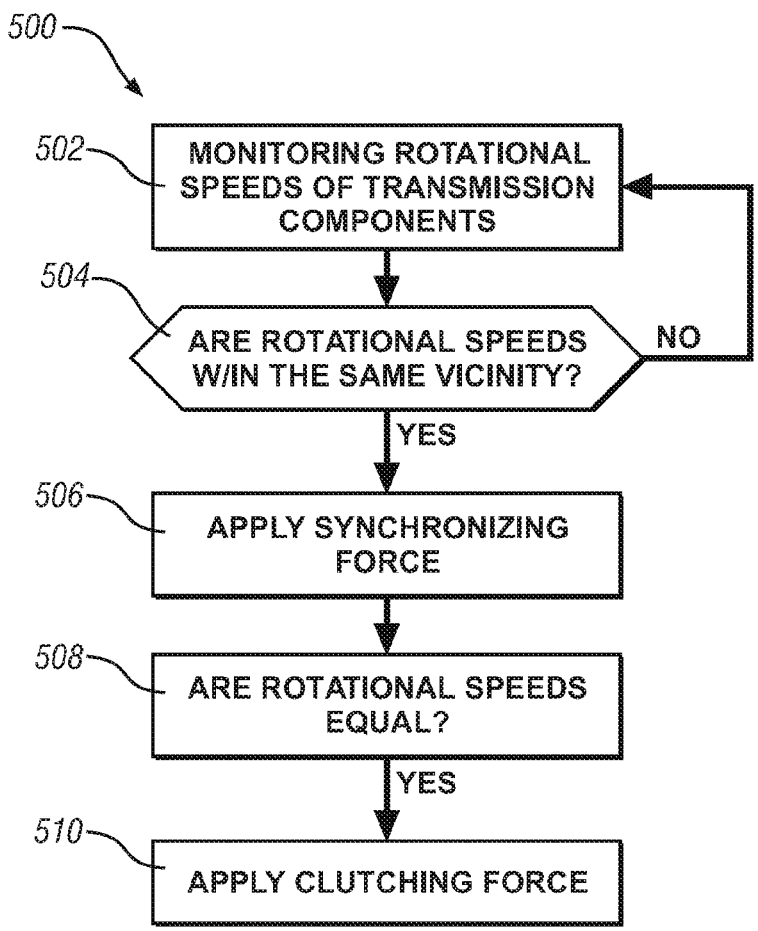
FIGS. 5A and 5B illustrate exemplary algorithms for selectively engaging and disengaging at least two transmission components utilizing the synchronizer of FIGS. 3A and 3B in accordance with the present disclosure.

Referring to FIG. 5A, the exemplary algorithm 500 for providing engagement between the input and output components is described in detail. In box 502, the rotational speeds of the input and output components to be engaged by the synchronizer 200 are monitored. In box 504, the algorithm 500 determines if the rotational speeds are within the same vicinity of one another. If the rotational speeds are not within the same vicinity of each other, the algorithm 500 continues monitoring the rotational speeds in box 502. If the rotational speeds of the input and output components are within the same vicinity of each other, the algorithm 500 applies the synchronizing force 220 in box 506. In box 508, the rotational speeds of the input and output components are monitored until the rotational speeds are equal. When the algorithm 500 determines that the two rotational speeds of the transmission components are equal, the algorithm 500 applies the clutching force 222 to engage the two transmission components to one another and thereby transfer torque therebetween.

Figure 5B:
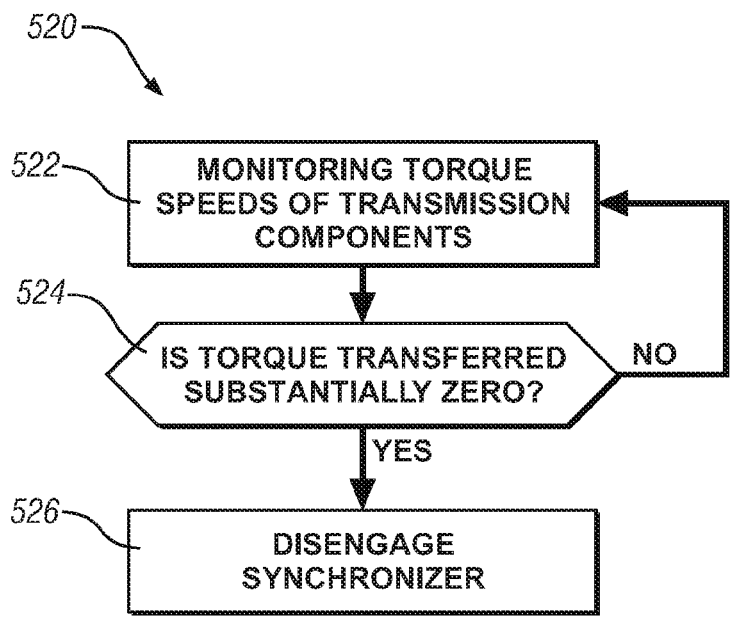

Referring to FIG. 5B, the exemplary algorithm 520 for disengaging the two transmission components is described in detail. As mentioned above, it is understood that the amount of torque transferred between input and output components must drop to substantially zero before the synchronizer 200 can be deactivated and disengagement provided. In block 522, the torque transferred between the input and output components is monitored. In block 524, the algorithm 520 determines if the monitored torque transferred has dropped to substantially zero. If the torque is not substantially zero, the algorithm reverts back to block 522. If the monitored torque between the input and output components is substantially zero, the synchronizer 200 is deactivated, wherein the biasing force 228 disengages said input and output components from each other.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An electro-mechanical transmission including an input member, an output member and a plurality of planetary gears and torque transfer devices, the electro-mechanical transmission further comprising:
   a synchronizer selectively engaging and disengaging input and output components of the transmission, the synchronizer comprising
     a piston sequentially applying a synchronizing force and a clutching force when said synchronizer is activated,
     a blocker member,
     an input cone associated with said input components and extending radially inside said blocker member,
     an output cone associated with said output components and extending radially inside said blocker member and having a radius different than said input cone,
     a sleeve member coupled to said piston member and compressing said blocker member thereby generating a friction force between said input and output cones to synchronize rotational speeds between the input and output components in response to said synchronizing force and, after the rotational speeds between the input and output components are synchronized to establish a clutch slip of zero between the input and output components, sequentially engaging said output components to said input components in response to said clutching force, and
     a biasing member providing a biasing force against said piston and sleeve member in a direction opposite to said synchronizing and clutching forces, thereby disengaging said output components from said input components when said synchronizer is deactivated.

2. The electro-mechanical transmission of claim 1, wherein said piston member, sleeve member and biasing member are associated with said output components.

3. The electro-mechanical transmission of claim 1, wherein said input components rotate independently of said output components.

4. The electro-mechanical transmission of claim 3, wherein said output components correspond to a stationary transmission housing and said input components correspond to gear members associated with one of the planetary gears.

5. The electro-mechanical transmission of claim 1, wherein said output components correspond to a first set of gear members associated with one of the plurality of planetary gears and said input components correspond to a second set of gear members associated with one of the plurality of planetary gear sets.

6. The electro-mechanical transmission of claim 1, further comprising a control module monitoring the rotational speeds of said input and output components and selectively activating and deactivating said synchronizer when monitored rotational speeds are synchronized.

7. A two-mode compound split hybrid electro-mechanical transmission, comprising:
   a plurality of transmission components;
   a synchronizer selectively engaging and disengaging at least two of the transmission components to effect operation in a speed range in the transmission, the synchronizer further comprising:
     a plurality of input components associated with one of said transmission components;
     a plurality of output components including a clutching mechanism engaged to one of said input components when said synchronizer is activated and disengaged from said input component when said synchronizer is deactivated; and
     the clutching mechanism including a piston applying a synchronizing force for synchronizing rotational speeds between the input and output components and, after the rotational speeds between the input and output components are synchronized to establish a clutch slip of zero between the input and output components, sequentially applying a clutching force by said piston to engage said output components to said input components.

8. The electro-mechanical transmission of claim 7, wherein said input components rotate together independent of said output components.

9. The electro-mechanical transmission of claim 7, wherein said output components rotate together independent of said input components.

10. The electro-mechanical transmission of claim 7, wherein said output components are stationary and said input components rotate.

11. The electro-mechanical transmission of claim 7, wherein said input components are stationary and said output components rotate.

12. The electro-mechanical transmission of claim 7, wherein one of said transmission components includes a transmission housing.

13. The electro-mechanical transmission of claim 7, wherein at least one of said transmission components includes a planetary gear set utilizing first, second and third gear members.

14. The electro-mechanical transmission of claim 7, wherein said input and output components include input and output synchronization cones for synchronizing rotational speeds of said input and output components when said synchronizer is activated.

15. The electro-mechanical transmission of claim 14, wherein said output components further include a piston coupled to a sleeve member, said piston applies a synchronization force to translate said sleeve member and compresses said output synchronization cone to generate friction between said input and output synchronization cones.

16. The electro-mechanical transmission of claim 14, wherein said input and output components require rotational speeds within the same vicinity of one another prior to synchronization and activation of said synchronizer.

17. The electro-mechanical transmission of claim 16, wherein said vicinity is less than or equal to 50 RPM.

18. The electro-mechanical transmission of claim 7, wherein the rotational speeds of said input and output components must be synchronized to a difference in rotational speeds of substantially zero prior to engagement.

19. The electro-mechanical transmission of claim 7, wherein said clutching mechanism engaging to one of said input components when said synchronizer is activated and disengaging from said input component when said synchronizer is deactivated comprises:

a piston applying a clutching force when said synchronizer is activated;

a sleeve member coupled to said piston member and selectively engaging to one of said input components in response to said clutching force; and a biasing member selectively disengaging said sleeve member from said input component when said synchronizer is deactivated.

20. Method to selectively engage and disengage rotation of input and output components within a transmission utilizing a synchronizer, the method comprising:

monitoring rotational speeds of said input and output components;

applying a synchronization force for synchronizing the rotational speeds of said input and output components when said synchronizer is activated based on the monitored rotational speeds;

applying a clutching force to engage said input and output components after the rotational speeds of said input and output components are synchronized to establish a clutch slip of zero between the input and output components when said synchronizer is activated;

monitoring torque transferred between said engaged input and output components; and utilizing a biasing force to disengage said output members from said input members based on said monitored torque.

21. The method of claim 20, wherein said synchronizer is deactivated when said torque transferred between said input and output members is substantially zero.

* * * * *